(12) United States Patent
Uji et al.

(10) Patent No.: US 7,971,951 B2
(45) Date of Patent: Jul. 5, 2011

(54) INKJET PRINTING APPARATUS AND PRINTING METHOD THEREFOR

(75) Inventors: Ayako Uji, Kawasaki (JP); Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 537 days.

(21) Appl. No.: 12/147,928

(22) Filed: Jun. 27, 2008

(65) Prior Publication Data

US 2009/0002417 A1    Jan. 1, 2009

(30) Foreign Application Priority Data

Jun. 28, 2007    (JP) .................................. 2007-171227

(51) Int. Cl.
*B41J 2/205*    (2006.01)

(52) U.S. Cl. .......................................... 347/15; 347/41

(58) Field of Classification Search ................ 347/9, 12, 347/14, 15, 16, 40, 41, 43, 54, 101
See application file for complete search history.

(56) References Cited

U.S. PATENT DOCUMENTS 5,633,663 A  *  5/1997  Matsubara et al. ............. 347/41

FOREIGN PATENT DOCUMENTS

JP             5-278232 A       10/1993

* cited by examiner

*Primary Examiner* — Thinh H Nguyen
(74) *Attorney, Agent, or Firm* — Canon USA Inc IP Division

(57) ABSTRACT

The printing elements of each printing element array are divided into blocks. A block to be driven and a block not to be driven are determined for each scanning of a printhead. The printhead is driven to print by complementing blocks to be driven by each scanning in a plurality of scanning operations. In each scanning, the printhead prints while making a printing area corresponding to at least one ink different from a printing area corresponding to another ink.

3 Claims, 9 Drawing Sheets

BLOCK A | BLOCK C | BLOCK E
BLOCK B  BLOCK D

A  D  E  B  C

BLOCK A | BLOCK C
BLOCK B  BLOCK D

☐ DRIVING PERMITTED AREA

▨ DRIVING INHIBITED AREA

| | SCANNING DIRECTION | Odd COLUMN | Even COLUMN | DRIVING PATTERN |
|---|---|---|---|---|
| COLOR 1 | FORWARD DIRECTION | A,C | B,D | 1 |
| | BACKWARD DIRECTION | B,D | A,C | 2 |
| COLOR 2 | FORWARD DIRECTION | D,B | C,A | 2 |
| | BACKWARD DIRECTION | C,A | D,B | 1 |

□ DRIVING PERMITTED AREA
▨ DRIVING INHIBITED AREA

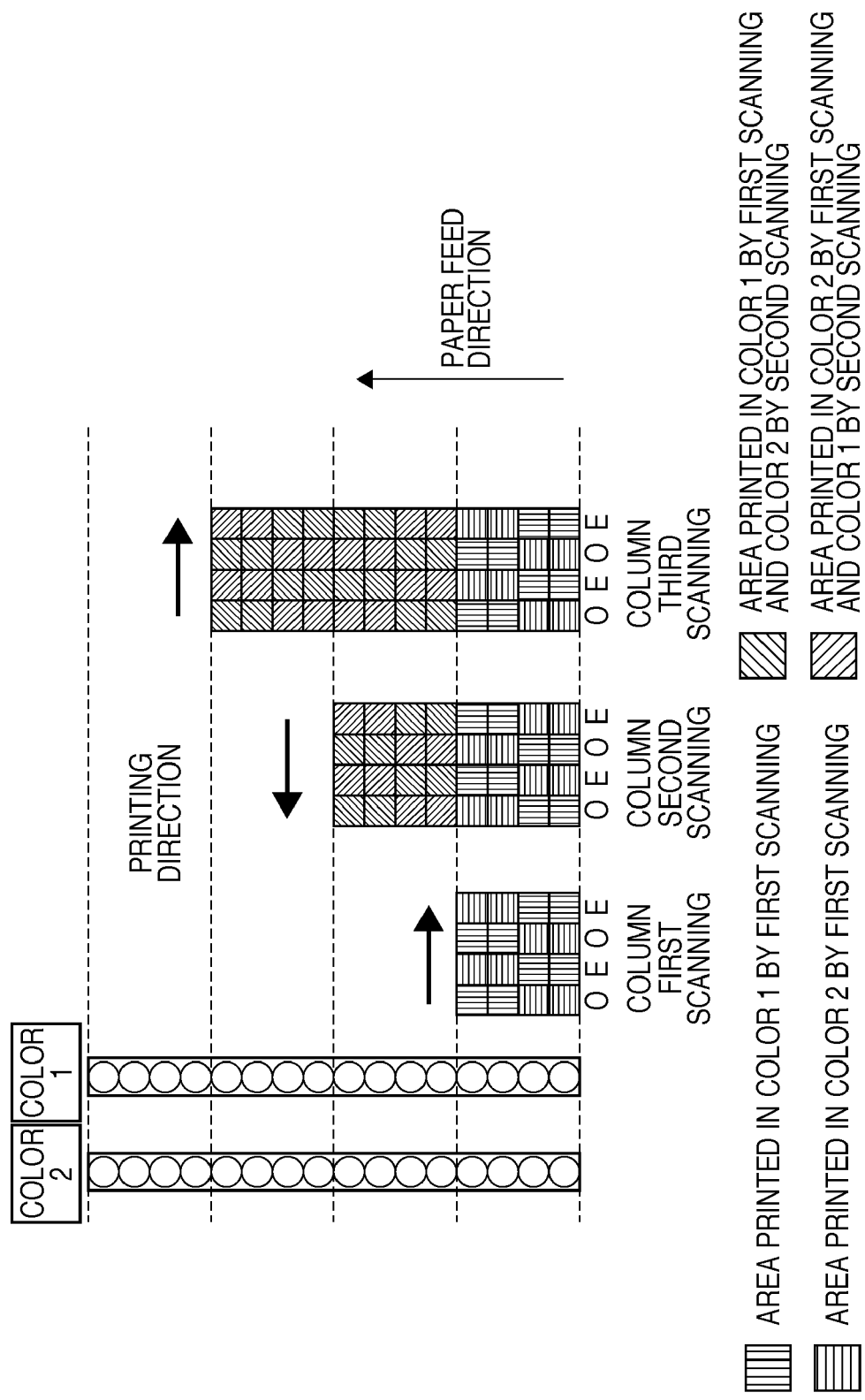

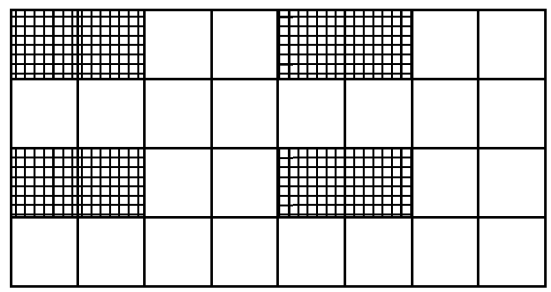
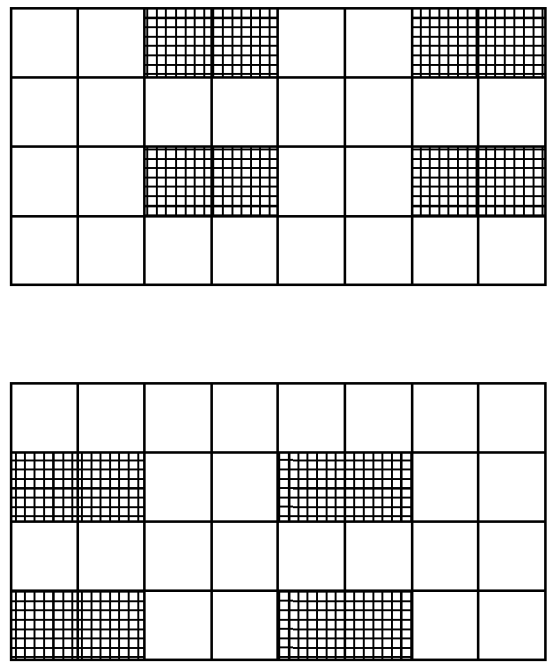
FIG. 9A  FIG. 9B  FIG. 9C  FIG. 9D

INKJET PRINTING APPARATUS AND PRINTING METHOD THEREFOR

BACKGROUND OF THE INVENTION

1. Field of the Invention

The present invention relates to an inkjet printing apparatus which forms an image by reciprocally scanning a print medium by a printhead a plurality of times, and a printing method therefor.

2. Description of the Related Art

Recently, with the increasing popularity of information processing apparatuses such as personal computers, various types of printing apparatuses capable of printing images have become available, and their performance has rapidly improved. Part of the mainstream of these printing apparatuses is an inkjet printing apparatus which prints on a print medium such as paper, cloth, or an OHP sheet by discharging ink from orifices. The inkjet printing apparatus has great advantages: it can perform non-impact low-noise printing, it can print at high density and high speed, it can easily achieve color printing, and its cost is low.

The inkjet printing apparatus having these advantages has improved the image quality by increasing the resolution of a printed image using smaller ink droplets. The inkjet printing apparatus has prevailed even in a field where high-quality large-size outputs such as a large-format photograph, poster, CG, and CAD are required. Speeding up of the inkjet printing apparatus is demanded while suppressing a decrease in throughput caused by upsizing.

To output a color image at high speed, so-called 1-pass printing is preferably performed to form an image in an area covered by one scanning of the printhead every scanning of the printhead. However, 1-pass printing lowers the image quality because irregular density typically appears in an image owing to variations in discharge amount and discharge direction caused by the error of the orifice manufacturing precision, the error of the mechanical precision of the printing apparatus, and the like.

As a measure against irregular density, multi-pass printing is generally adopted. In multi-pass printing, pixels printed by one scanning are decimated. The printhead scans a plurality of number of times the same area (band) on a print medium that is narrower than an area covered by one scanning of the printhead, thereby forming an image. Multi-pass printing can reduce irregular density caused by variations in discharge amount and discharge direction because an image is printed in the same area by discharging ink from orifices which are different between scanning operations (passes).

However, if orifice arrays (head chips) corresponding to ink colors (types) are aligned bilaterally asymmetrically in the printhead scanning direction when the printhead reciprocally scans to print, the order of inks landed on a print medium changes depending on the printhead scanning direction. For example, in printing with dye inks, an ink landed first stays in the print medium surface layer. The color of an ink landed first influences the tint of an image greater than the color of an ink landed later. For this reason, in multi-pass printing, an ink color printed first by the first pass greatly influences the tint of the band. However, when orifice arrays aligned bilaterally asymmetrically and the printhead reciprocally scans to print, the ink color printed first by the first pass differs between bands. Areas with different tints alternately appear on a print medium, and the irregular density is recognized in the image. As a method of avoiding irregular density, Japanese Patent Laid-Open No. 5-27832 discloses a method of changing, for each print color, a mask pattern (pass mask) for dividing print data in correspondence with a plurality of scanning operations in multi-pass printing. The method disclosed in this reference can reduce the influence of irregular density because pixels with different ink landing orders can be distributed in any band on a print medium.

For a printer such as a large-format printer in which the printhead scans in a large width, it is necessary to increase the moving speed of the printhead for high-speed printing, and thus increase the ink discharge frequency. However, this method delays transfer of data (discharge pattern) which determines orifices for discharging ink.

One method of solving this problem is block decimation. According to this method, nozzles for discharging ink are divided into blocks, and the nozzle driving timing is shifted for each block. In this time division driving, blocks driven in one cycle (one column) are limited, and the printhead scans the same area on a print medium a plurality of times. As a result, the discharge pattern can be transferred in time. However, when performing block decimation, blocks (nozzles) permitted to be driven by the same pass are the same in all orifice arrays in the conventional arrangement in which orifice arrays are aligned bilaterally asymmetrically and the printhead reciprocally scans to print. Thus, no irregular density can be suppressed.

SUMMARY OF THE INVENTION

Embodiments of the present invention provide an inkjet printing apparatus capable of obtaining a high-quality image almost free from degradation of the image quality caused by irregular density without decreasing the throughput, and a printing method therefor.

According to a first aspect of the present invention, there is provided an inkjet printing apparatus which prints by scanning an area on a print medium a plurality of times with a printhead having printing element arrays corresponding to different types of inks including a first ink and a second ink, the apparatus comprising: a driving unit for driving the printhead in which printing elements in the printing element arrays corresponding to the first ink and the second ink are divided into blocks and a block to be driven is determined for each scanning of the printhead; and a control unit for controlling the printhead to print while making an area printed with the first ink different from an area printed with the second ink in each scanning of the printhead.

In some embodiments, the apparatus further comprises a storage unit for storing mask patterns complementary to each other in a plurality of scanning operations of the printhead, wherein the driving unit drives the printhead by sequentially using the mask patterns in the respective scanning operations of the printhead in order to complete printing by the plurality of scanning operations.

In some embodiments, the driving unit drives the blocks by time division.

In some embodiments, the printhead has two printing element arrays for each of the different types of inks.

According to a second aspect of the present invention, there is provided a printing method of printing by scanning an area on a print medium twice with a printhead having a first printing element array and a second printing element array, and driving printing elements of each of the first printing element array and the second printing element array by time division for each block, the method comprising: printing in a first scanning of the area by driving printing elements of the first printing element array by time division, and driving by time division printing elements of the second printing element array that are at positions different from positions of the printing elements of the first printing element array; and printing in a second scanning of the area by driving by time division other printing elements of the first printing element array that are at positions different from the positions of the printing elements of the first printing element array, and driving by time division other printing elements of the second printing element array that are at the same positions as the positions of the printing elements of the first printing element array.

According to a third aspect of the present invention, there is provided a printing method of printing by scanning an area on a print medium a plurality of times with a printhead having a first printing element array and a second printing element array, and driving printing elements of each of the first printing element array and the second printing element array by time division for each block, the method comprising: selecting printing elements of the first printing element array to be driven by time division in a first scanning operation in the area; selecting other printing elements of the first printing element array, different than said printing elements of the first printing element array, to be driven in a second scanning operation in the area; selecting printing elements of the second printing element array to be driven by time division in the first scanning operation in the area; and selecting other printing elements of the second printing element array, different than said printing elements of the second printing element array, to be driven in the second scanning operation, wherein positions of said printing elements of the second printing element array are different from positions of said printing elements of the first printing element array, and wherein positions of said other printing elements of the second printing element array are different from positions of said other printing elements of the first printing element array.

According to a fourth aspect of the present invention, there is provided a printing method for an inkjet printing apparatus which prints by scanning an area on a print medium a plurality of times with a printhead having printing element arrays corresponding to different types of inks including a first ink and a second ink, the method comprising: printing by driving the printhead in which printing elements in the printing element arrays corresponding to the first ink and the second ink are divided into blocks and a block to be driven is determined for each scanning of the printhead; and wherein, in the printing, an area printed with the first ink is different from an area printed with the second ink in each scanning of the printhead.

Further features of the present invention will be apparent from the following description of exemplary embodiments with reference to the attached drawings.

BRIEF DESCRIPTION OF THE DRAWINGS

FIG. 8 is a view showing a printing result obtained by the printing method according to the first embodiment;

FIGS. 9A to 9D are views showing mask patterns used in the second embodiment.

DESCRIPTION OF THE EMBODIMENTS

Some embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In this specification, the term "print" (to be also referred to as "printing" hereinafter) not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes paper used in general printing apparatuses, but also broadly includes materials capable of accepting ink, such as cloth, a plastic film, a metal plate, glass, ceramics, wood, and leather.

Further, the term "ink" should be extensively interpreted similar to the definition of "print" described above. That is, "ink" includes a liquid which, when applied onto a print medium, can form images, figures, patterns, and the like, can process the print medium, and can process ink. Ink processing includes solidification or insolubilization of a coloring agent contained in ink applied to the print medium.

Unless otherwise specified, the term "nozzle" generally means a set of a discharge orifice, a liquid channel connected to the orifice, and an element to generate energy utilized for ink discharge.

First Embodiment

Figure 1:
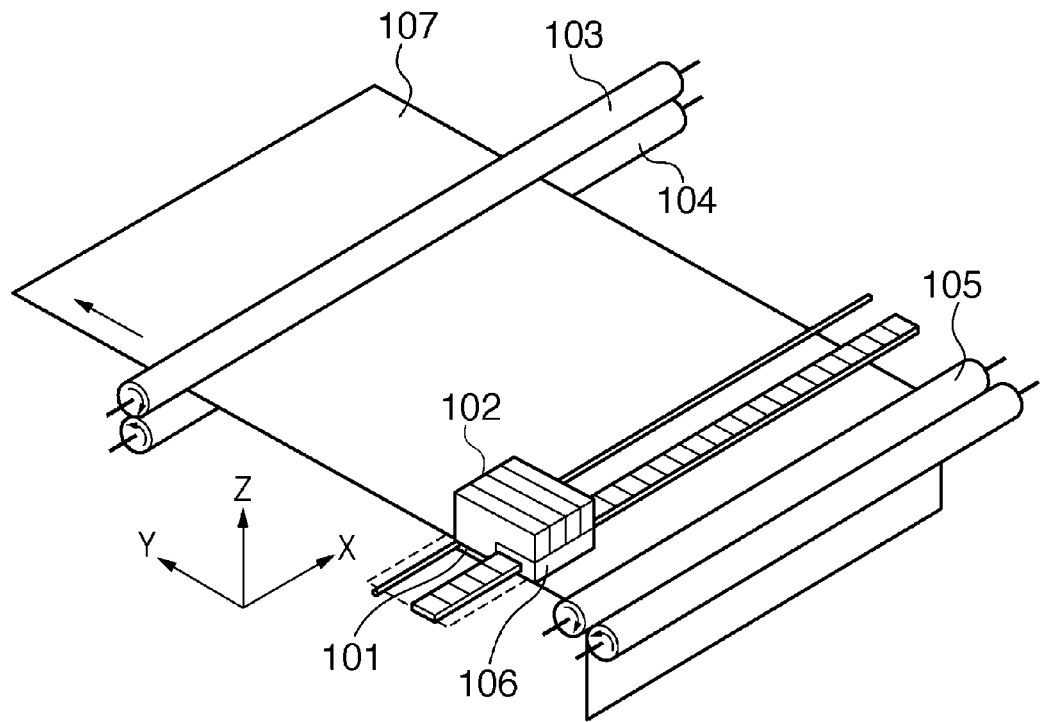
FIG. 1 is a schematic perspective view showing an inkjet printing apparatus to which an embodiment is applicable.

FIG. 1 is a schematic perspective view showing the structure of an embodiment of a color inkjet printing apparatus to which the present invention is applicable.

In FIG. 1, ink cartridges 102 are made up of printheads 101, and ink tanks which contain color inks of four colors, i.e., Y (Yellow), M (Magenta), C (Cyan), and K (blacK). Each printhead 101 has printing elements (nozzles) for discharging ink. The printhead 101 is configured by parallel-arranging the arrays (nozzle arrays) of printing elements corresponding to each of color inks of the four colors. Each ink tank is detachable from the printhead 101.

While pressing a print medium 107 together with an auxiliary roller 104, a paper feed roller 103 rotates in the direction of an arrow in FIG. 1, feeding the print medium 107 in the Y direction. Rollers 105 also press the print medium 107, similar to the paper feed roller 103 and auxiliary roller 104. A carriage 106 supports the four ink cartridges (pairs of ink tanks and printheads) 102. As printing progresses, the carriage 106 reciprocates the mounted ink cartridges 102 and printheads 101 in the X direction perpendicular to the printing element array direction.

The carriage 106 is controlled to stand by at a home position indicated by a dotted line in FIG. 1 when the inkjet printing apparatus does not print or the printhead 101 is recovered. The inkjet printing apparatus having this arrangement reciprocally prints by multiple passes (scanning operations).

Ink is supplied to the printhead 101 by the above-mentioned method, but may also be supplied to the printhead 101 via a supply tube from an ink tank installed at a position where the carriage 106 does not scan. In this case, it is preferable to connect the ink tank and supply tube by a pin which is designed to have an opening positioned in the bottom surface of the ink tank. The number of ink colors used is not limited to four.

Figure 2:
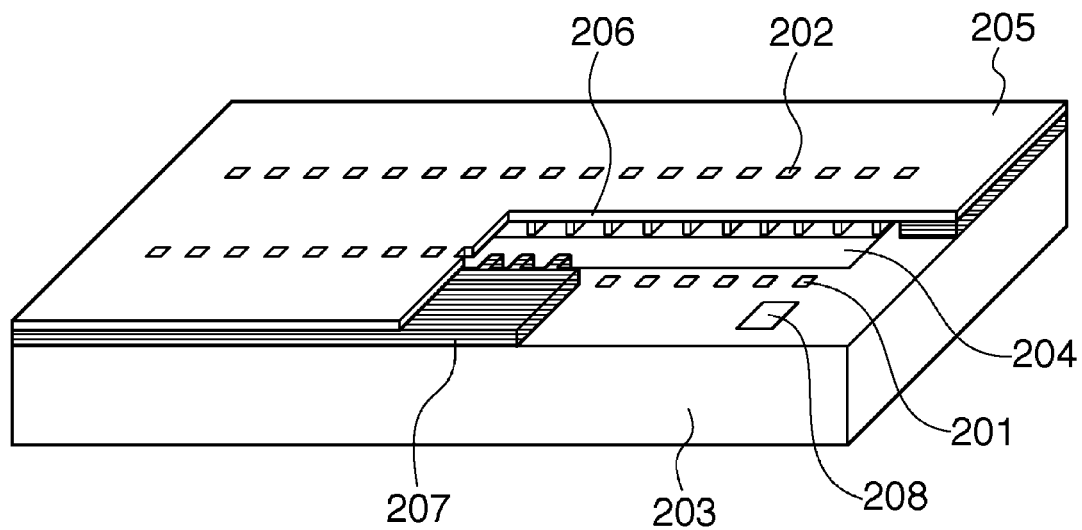
FIG. 2 is a schematic view showing the structure of part of a printhead.

FIG. 2 is a partially cutaway perspective view showing the structure of the printhead 101 near the orifice. In FIG. 2, a heater 201 heats ink. Ink is discharged using film boiling of ink caused by heat energy applied by the heater.

The printhead 101 comprises ink orifices 202, an element substrate 203, an ink supply port 204 for ink supplied from the ink tank, and an orifice plate 205 having the ink orifices 202. The printhead 101 also comprises channel walls 206 which form ink channels extending to the ink orifices, a resin film layer 207, and a temperature sensor 208 which detects the head temperature.

Figure 3:
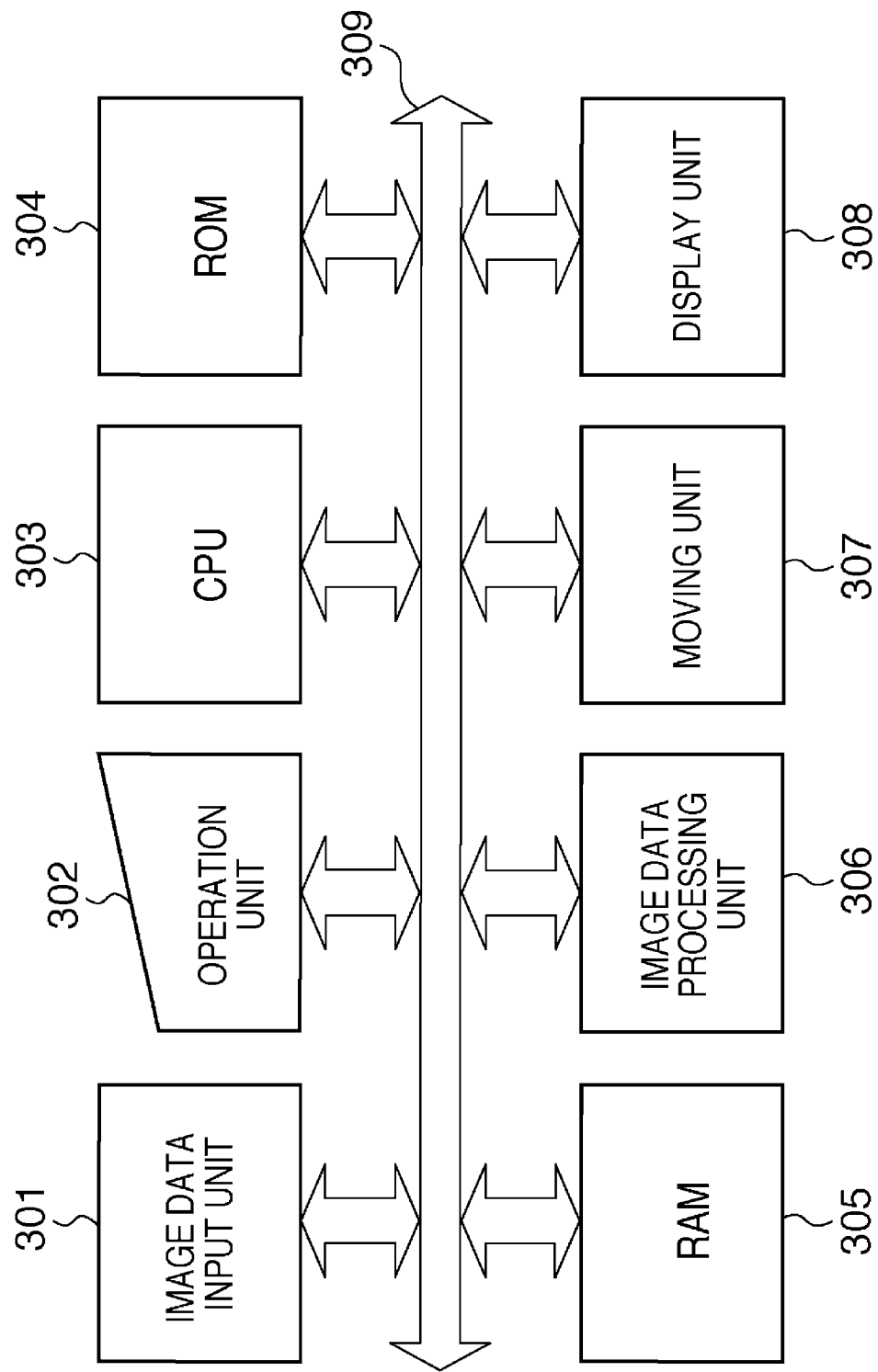
FIG. 3 is a block diagram showing an example of the configuration of a control system in the inkjet printing apparatus according to the embodiment.

FIG. 3 is a block diagram showing an example of the configuration of a control system in the inkjet printing apparatus according to the embodiment. In FIG. 3, the control system comprises an image data input unit 301, an operation unit 302, and a CPU 303 which performs various processes. A ROM 304 stores various data and various control programs. The ROM 304 also stores a printhead driving pattern, mask pattern (pass mask), and the like. The control system also comprises a RAM 305 and image data processing unit 306. A moving unit 307 moves the carriage 106. A display unit 308 outputs an image. A bus line 309 transfers data.

Each unit will be explained in more detail. The image data input unit 301 receives multivalued image data from an image input device such as a scanner or digital camera, or those saved in, e.g., the hard disk of a computer. The operation unit 302 has various keys for setting various parameters and designating the start of printing. The CPU 303 controls the printing apparatus in accordance with various control programs in the ROM 304. The RAM 305 is used as a work area for the control program and image processing, and a temporary save area for error processing.

The image data processing unit 306 quantizes input multi-valued image data into N-ary image data for each pixel, and creates a discharge pattern corresponding to a tone value K represented by each quantized pixel. That is, the image data processing unit 306 creates a discharge pattern corresponding to the tone value K after executing N-ary processing for input multivalued image data. The display unit 308 discharges ink on the basis of the discharge pattern created by the image data processing unit, thereby forming an image on a print medium. The bus line transmits an address signal, data, control signal, and the like in the apparatus.

A method of controlling driving of each nozzle of the printhead in the inkjet printing apparatus having this arrangement will be described in detail.

Figure 4:
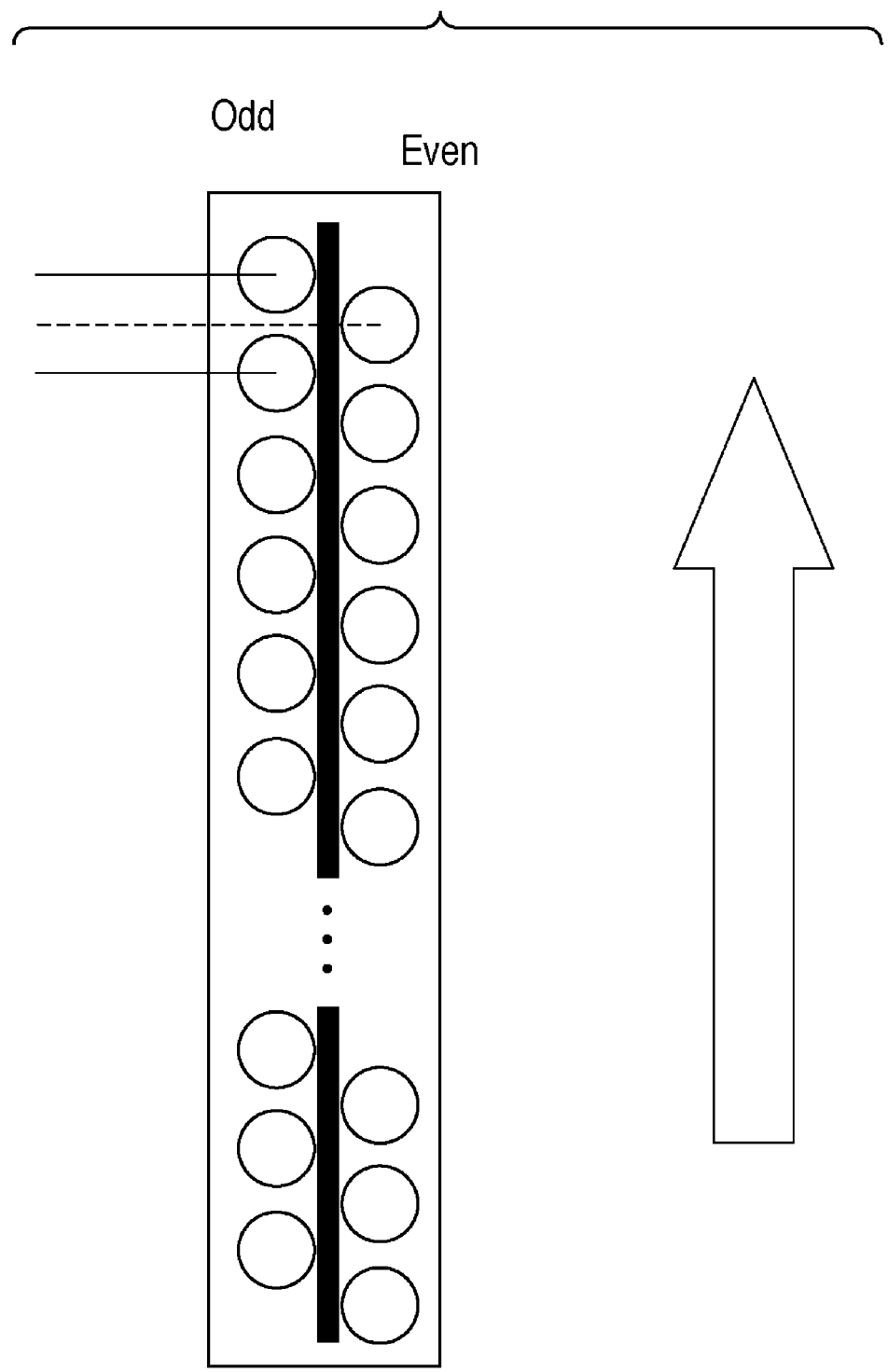
FIG. 4 is a schematic view showing the orifice surface of the printhead.

FIG. 4 is a schematic view showing the orifice surface of the printhead.

The printhead has an orifice array in which orifices are aligned along the longitudinal direction. The printhead used in the present invention has two orifice arrays for each ink color. Odd and Even orifice arrays are arranged on the two sides of the ink supply port while shifting from each other at a half pitch in the orifice array direction, as shown in FIG. 4. In the inkjet printing apparatus, the orifice surface faces the print medium. The print medium is conveyed in the direction of an arrow, and printing is done while the printhead moves relatively to the print medium.

If all nozzles are simultaneously driven to print with the printhead, the maximum power consumption rises. A large-size power supply capable of supplying such large power needs to be adopted, but is not preferable in terms of cost. Thus, nozzles are generally divided into blocks, and the blocks are driven by time division while slightly shifting the discharge timing for each block. The printhead having the Odd and Even orifice arrays, like the embodiment, executes time division driving corresponding to the same driving pattern for the respective orifice arrays.

Figure 5A:
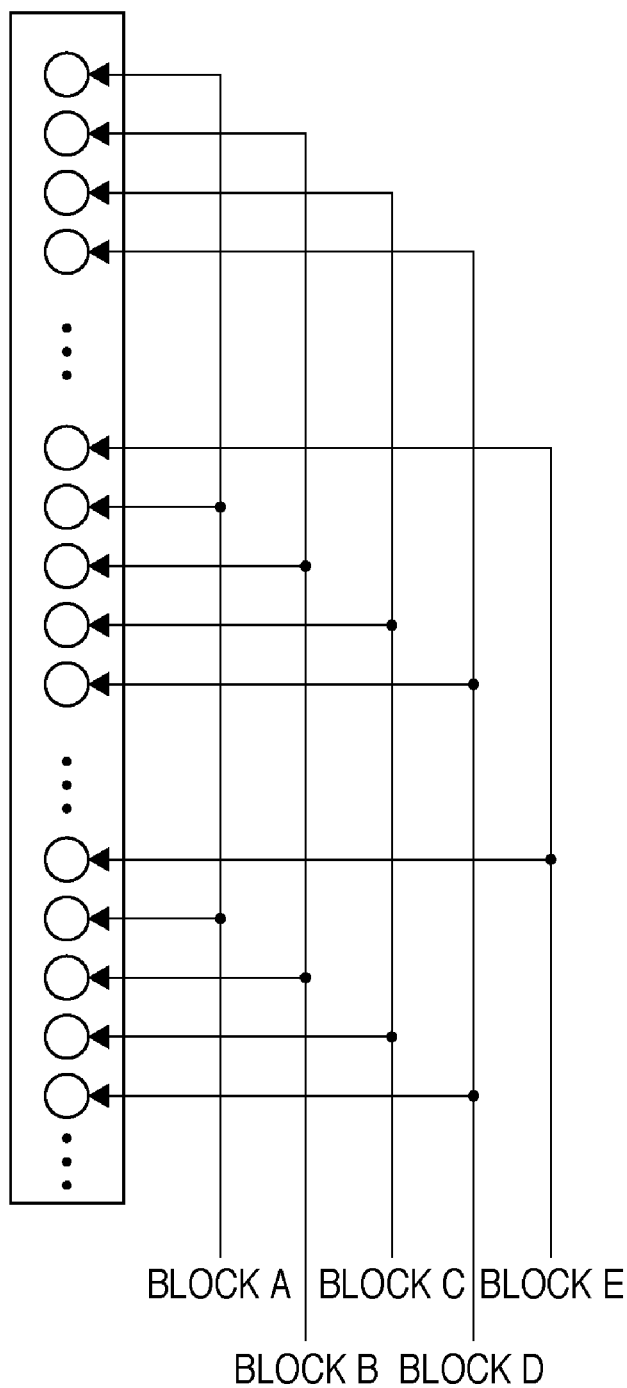
FIGS. 5A and 5B are views showing a driving method of dividing orifices into blocks and driving the blocks by time division.
Figure 5B:
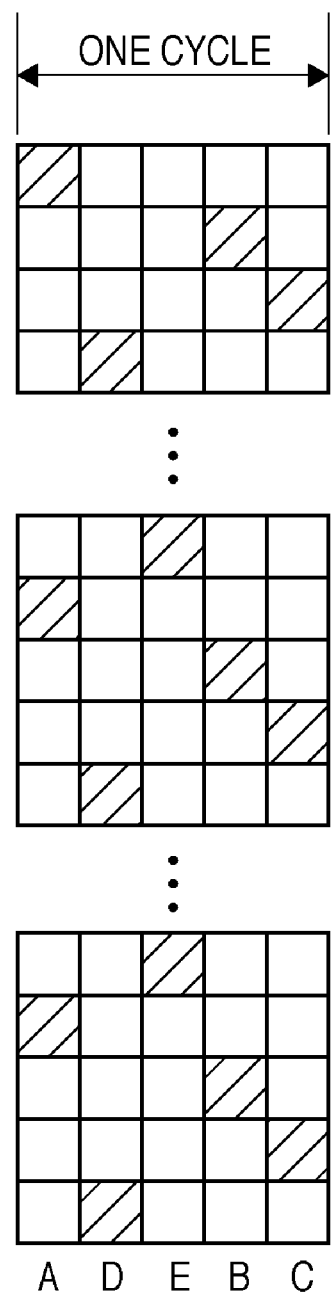

FIG. 5A is a view showing nozzle groups simultaneously driven when nozzles are divided into blocks. As the time division driving method, the orifice driving timing is shifted between blocks in one cycle of block A→D→E→B→C, as shown in FIG. 5B.

To form a printed image at higher speed, the printhead moving speed may be increased to increase the discharge frequency, or the number of orifices may be increased to widen an area printable by one scanning of the printhead. In this case, it becomes more difficult to drive all blocks within one cycle owing to power consumption as described above. In addition, data transfer of the discharge pattern delays. As a measure against these problems, there is proposed a method (block decimation) of limiting the number of blocks driven in one cycle, decreasing the discharge frequency while keeping the printhead moving speed high, and performing data transfer in time.

As the block decimation method, a plurality of driving patterns which define a driving permitted area and driving inhibited area are prepared in advance, and nozzles are driven in accordance with the patterns.

Figure 6A:
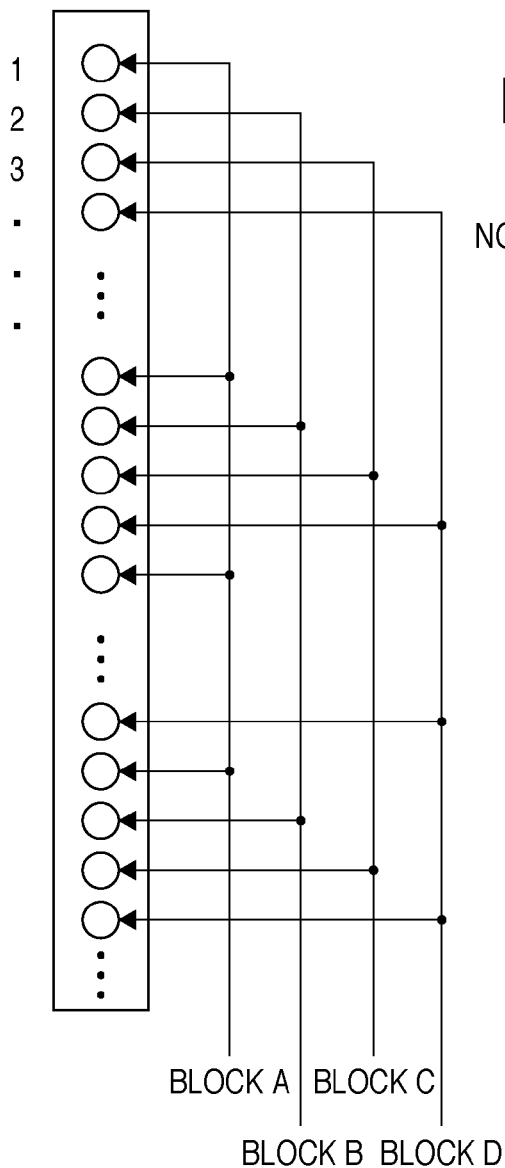
FIGS. 6A to 6C are views showing a printing method based on half block driving.
Figures 6B, 6C:
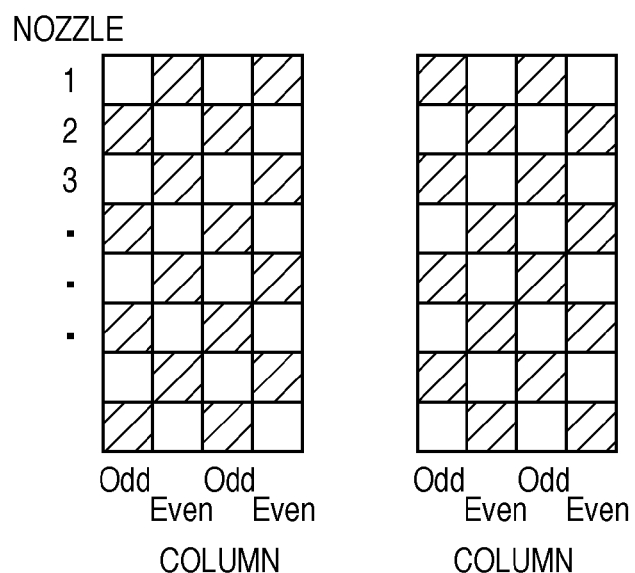

FIGS. 6A to 6C are views showing an example of a driving pattern based on half block driving of dividing each orifice array of the printhead into four blocks and limiting the number of blocks driven in one cycle to half. FIG. 6A shows the blocks of nozzles in the Odd and Even orifice arrays. According to the pattern of FIG. 6B, blocks A and C are driven in an Odd column, and blocks B and D are driven in an Even column. FIG. 6C shows a pattern complementary to that of FIG. 6B.

When this half block driving is executed, the number of nozzles driven in one cycle is half the number of nozzles of each orifice array. To print in all printable areas, the driving pattern needs to be switched between complementary patterns every scanning of the printhead to scan at least twice the same area printable by one scanning. More specifically, ink is discharged in accordance with the driving pattern of FIG. 6B in the forward direction, and ink is discharged in accordance with the complementary driving pattern of FIG. 6C in the backward direction. As a result, printing can be complete in all printing areas.

Figures 7A, 7B:
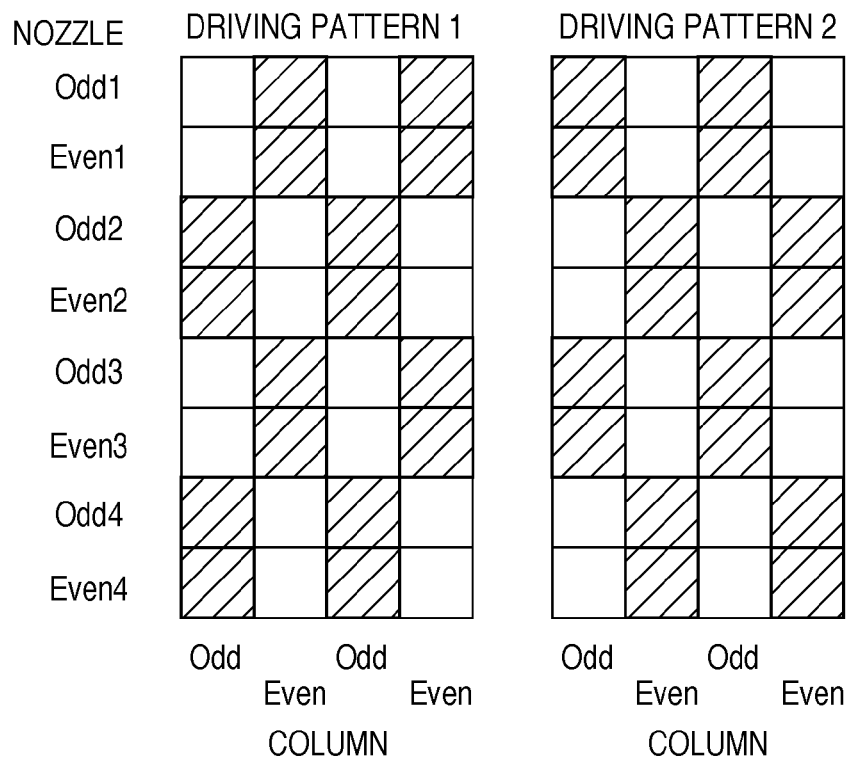
FIGS. 7A and 7B are a table and view, respectively, showing a printing method according to the first embodiment.

FIG. 7A shows the printhead driving pattern and nozzle driving order when two orifice arrays discharge different types of inks to print in forming an image by applying the present invention. Each printhead for discharging each ink performs half block driving as shown in FIGS. 6A to 6C for both the Odd and Even columns. Note that A to D in FIG. 7A correspond to blocks A to D in FIG. 6A. FIG. 7B shows driving patterns when executing half block driving as shown in FIGS. 6A to 6C.

More specifically, for ink (first ink) of color 1 out of the two types of inks, it is set to drive the printhead in accordance with driving pattern 1 in the forward direction and driving pattern 2 in the backward direction. For ink (second ink) of color 2, it is set to drive the printhead in accordance with driving pattern 2 in the forward direction and driving pattern 1 in the backward direction. For example, an Odd column "A,C" in the forward direction for ink of color 1 in FIG. 7A means driving nozzles in the order of A and C. In this case, A is a driving permitted area which is the first from the left and the first from the top in driving pattern 1 in FIG. 7B. C is a driving permitted area which is the third from the left and the fifth from the top.

FIG. 8 shows the result of printing by discharging two different types of inks onto the same printing area according to this printing method. In the third and fourth scanning operations, printing is done to complement areas printed by the first and second scanning operations. In FIG. 8, the Odd and Even orifice arrays are illustrated as one orifice array. Orifice arrays for colors 1 and 2 shown in FIG. 8 are Odd 1, Even 1, Odd 2, Even 2, . . . shown in FIG. 7B.

Attention is paid to overlapping of ink colors in each printing area to reveal that inks of colors 1 and 2 do not simultaneously land on the same pixel in one scanning of the printhead. Also, the overlapping order of colors 1 and 2 is the same between scanning operations in all printing areas. The time difference between printing in color 1 and printing in color 2 does not vary. As a result, irregular density caused by change of the order of applied colors depending on the printhead scanning direction can be reduced.

This printing method can achieve both high-speed printing and high image quality even in a printing apparatus having a large printing width such as a large-format printer.

In the first embodiment, the same driving pattern is set for the nozzles of the Odd and Even columns of each printhead. However, the present invention is not limited to this, and different driving patterns may also be applied. When printing is done using a plurality of color inks, the above-described arrangement can be effectively employed for two types of inks which should be prevented from being printed over each other.

Second Embodiment

In the second embodiment, a printing pattern is generated by multi-pass printing using a driving pattern as described in the first embodiment, and further using a pass mask in synchronism with the driving pattern.

FIGS. 9A to 9D show pass masks used in the second embodiment. The pass masks in FIGS. 9A and 9D are mask patterns for completing multi-pass printing, and are complementary to each other.

In the second embodiment, printing is performed using the pass masks in FIGS. 9A to 9D and driving patterns 1 and 2 in FIG. 7B.

The pass mask in FIG. 9A is used in forward scanning for an orifice array for discharging ink of the first color. The pass mask in FIG. 9B is used in forward scanning for an orifice array for discharging ink of the second color.

The pass mask in FIG. 9C is used in backward scanning for an orifice array for discharging ink of the first color. The pass mask in FIG. 9D is used in backward scanning for an orifice array for discharging ink of the second color.

Printing is done by driving the printhead by double the number of passes in the first embodiment. Unless otherwise specified, the printing method is the same as that in the first embodiment.

The printing method according to the second embodiment can implement both high image quality and high-speed printing which puts importance on improvement of the image quality in a printing apparatus having a large printing width such as a large-format printer.

When printing is performed in the same area by increasing the printhead scanning count, the pass mask is preferably used together with the driving pattern, like the second embodiment, instead of decreasing the number of driving blocks in one pass and increasing the scanning count.

For example, printing is done in the same area on a print medium by four scanning operations using a combination of driving patterns for driving half of all the blocks of each orifice array, and 2-pass mask patterns (printing ratio of 50%) for dividing, for two scanning operations, print data which defines nozzles to discharge ink.

The mask pattern (pass mask) can decrease the number of driving nozzles, similar to the driving pattern, because it has high degree of freedom to determine nozzles to be driven and nozzles not to be driven. The driving pattern can determine only nozzles to be driven or nozzles not to be driven in each block. For example, if the driving pattern determines not to drive nozzles belonging to block 1, all nozzles belonging to block 1 in the nozzle array are not driven.

To the contrary, the mask pattern (pass mask) can determine whether or not to drive each nozzle. For example, the mask pattern (pass mask) can determine not to drive a nozzle in block 1 and to drive another nozzle in block 1. In this manner, the pass mask can increase the degree of freedom of the layout of dots to be printed. Dots can be laid out easily at random, which is effective in reducing the dot graininess in image formation.

In the above-described embodiments, blocks permitted to be driven are different between the Odd and Even columns on the same pass. It is also possible to drive nozzles belonging to the same block in the Odd and Even columns.

Figure 10:
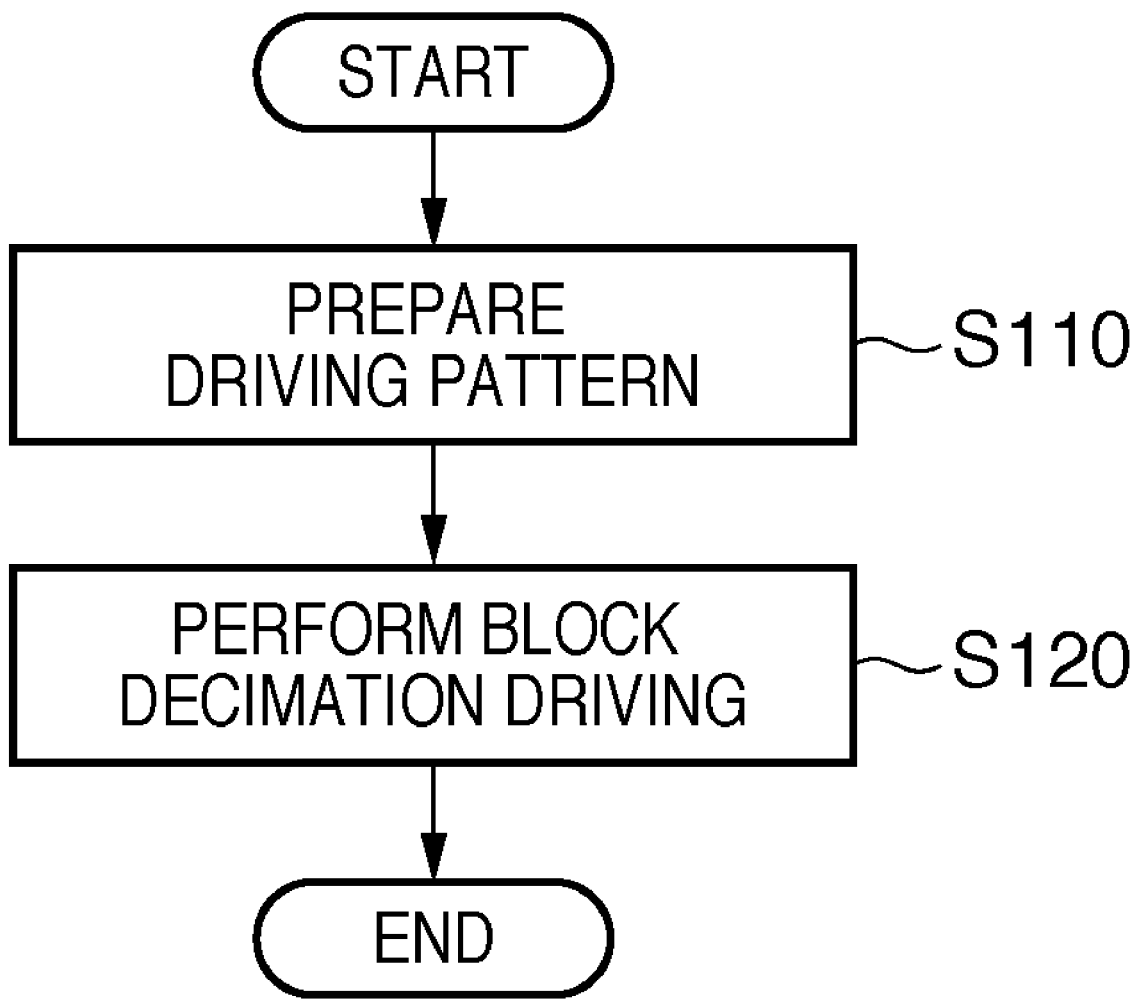
FIG. 10 is a flowchart showing an example of a printing method according to the present invention.

An example of the printing method according to the present invention will be explained with reference to the flowchart of FIG. 10.

In step S110, a driving pattern is prepared for each scanning of the printhead. In this driving pattern, a printing area corresponding to at least one of inks of different colors is different from a printing area corresponding to another ink.

In step S120, printing is executed by block decimation driving in accordance with the driving pattern. More specifically, the printing elements of each printing element array are divided into blocks. At least one block to be driven and at least one block not to be driven are determined for each scanning of the printhead. Printing is done by complementing blocks to be driven by each scanning in a plurality of scanning operations.

The present invention can obtain a high-quality image almost free from degradation of the image quality caused by irregular density without decreasing the throughput.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-171227, filed Jun. 28, 2007, which is hereby incorporated by reference herein in its entirety.

What is claimed is:

1. A printing method of printing by scanning an area on a print medium twice with a printhead having a first printing element array and a second printing element array, and driving printing elements of each of the first printing element array and the second printing element array by time division for each block, the method comprising:

printing in a first scanning of the area by driving printing elements of the first printing element array by time division, and driving by time division printing elements of the second printing element array that are at positions different from positions of said printing elements of the first printing element array; and printing in a second scanning of the area by driving by time division other printing elements of the first printing element array that are at positions different from the positions of said printing elements of the first printing element array, and driving by time division other printing elements of the second printing element array that are at the same positions as the positions of said printing elements of the first printing element array.

2. The method according to claim 1, wherein said first printing elements array and said second printing elements array execute printing with a different color of ink.

3. A printing method of printing by scanning an area on a print medium a plurality of times with a printhead having a first printing element array and a second printing element array, and driving printing elements of each of the first printing element array and the second printing element array by time division for each block, the method comprising:

selecting printing elements of the first printing element array to be driven by time division in a first scanning operation in the area;

selecting other printing elements of the first printing element array, different than said printing elements of the first printing element array, to be driven in a second scanning operation in the area;

selecting printing elements of the second printing element array to be driven by time division in the first scanning operation in the area; and selecting other printing elements of the second printing element array, different than said printing elements of the second printing element array, to be driven in the second scanning operation, wherein positions of said printing elements of the second printing element array are different from positions of said printing elements of the first printing element array, and wherein positions of said other printing elements of the second printing element array are different from positions of said other printing elements of the first printing element array.

* * * * *